June 25, 1935. C. C. HINKLEY 2,005,858
COMPRESSION CONTROL APPARATUS
Filed March 26, 1934
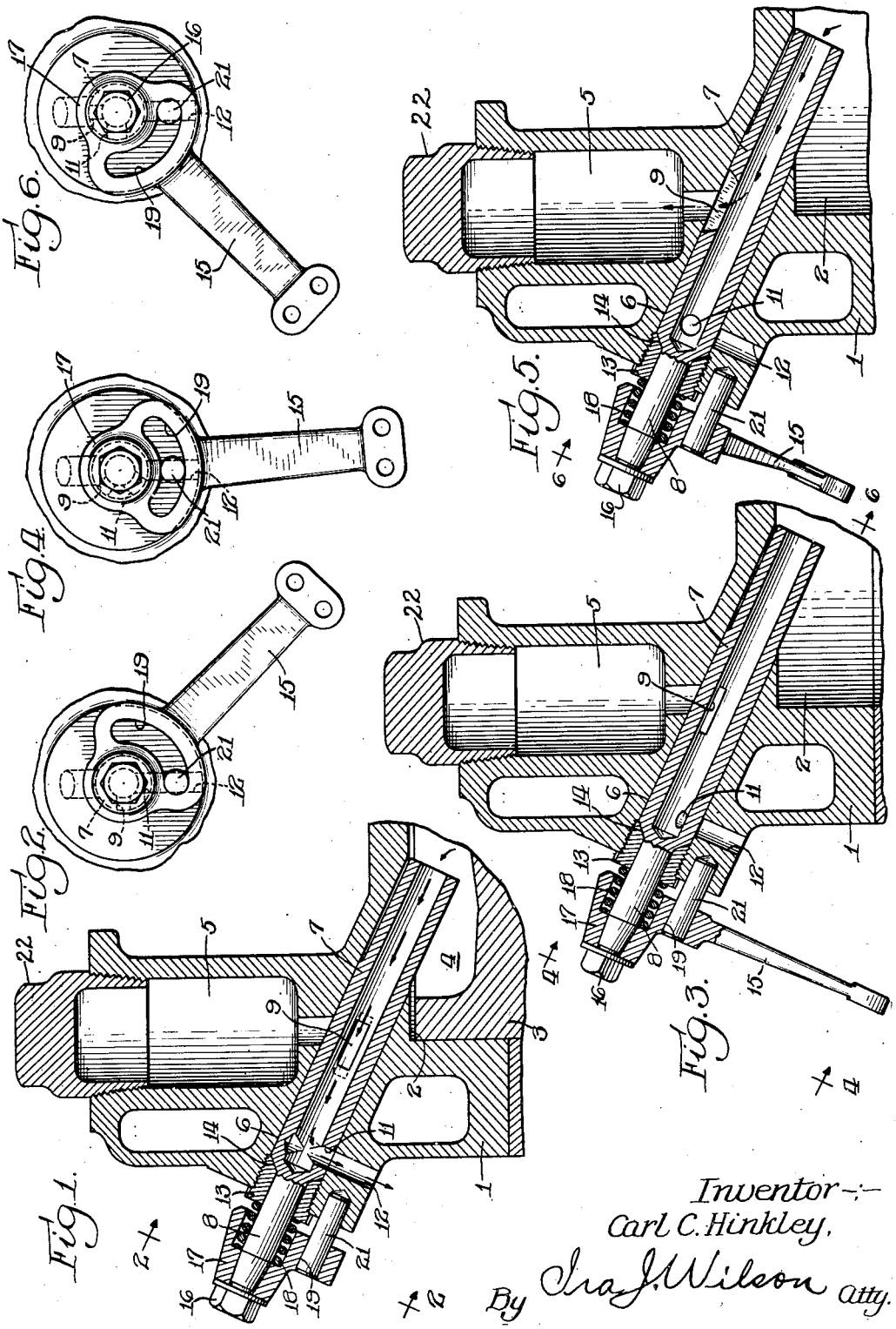
Inventor:—
Carl C. Hinkley,
By Ira J. Wilson atty.

Patented June 25, 1935

2,005,858

UNITED STATES PATENT OFFICE 2,005,858

COMPRESSION CONTROL APPARATUS

Carl C. Hinkley, Chicago, Ill., assignor to The Buda Company, Harvey, Ill., a corporation of Illinois Application March 26, 1934, Serial No. 717,338

1 Claim. (Cl. 123—48)

This invention pertains generally to compression controlling apparatus for internal combustion engines of the type which employ auxiliary air supply chambers in conjunction with the cylinders.

In order to regulate the compression in the working cylinders, control valves are provided in accordance with this invention for establishing communication between the cylinders and their auxiliary chambers, between the cylinders and the atmosphere or sealing the outlets from the cylinders.

The valves which are herein disclosed make it possible to locate the auxiliary chamber or after chamber some distance from the cylinder and establish the connecting passage through the elongated tubular valve.

The design of the valves is such that they may be installed and removed for inspection or replacement without removal of the cylinder head.

A further advantage of the invention lies in the ease with which the valves may be made leak-proof without rendering them difficult to manipulate or remove.

Other advantages of the invention will become apparent from a perusal of the specification and drawing herein.

In the drawing:

Fig. 1 is a fragmentary vertical sectional view of a cylinder block constructed in accordance with this invention, showing the valve establishing communication from the cylinder to the outside atmosphere, Fig. 2 is an end view of the valve of the invention shown in the position illustrated by Fig. 1, Fig. 3 is a vertical sectional view of the same block showing the valve closed both to the atmosphere and to the auxiliary chamber, Fig. 4 is an end view of the valve occupying the position of Fig. 3, Fig. 5 shows the same valve establishing communication between the cylinder and auxiliary chamber, and Fig. 6 is an end view of the valve in the position shown in Fig. 5.

Referring now to the drawing, the cylinder block is generally indicated as 1 and is provided with a cylinder 2, only partially shown, in which a piston 3 reciprocates. Part of the combustion chamber in the cylinder is formed by a recess 4 in the top of the piston.

In the cylinder block above the cylinder is located an auxiliary air chamber 5, or "after" chamber. Extending from the outside of the block into the top of the cylinder is a passage or bore 6 into which may be inserted the hollow valve stem 7 having at its outer end a shaft 8. A port 9, when the valve stem is rotated to the proper position, establishes communication from the cylinder into the auxiliary chamber, while a port 11 establishes communication from the cylinder and hollow valve stem and through the duct 12 to the atmosphere. For this last position of the valve see Fig. 1.

As shown in Fig. 3, the valve may be rotated so that neither of these ports will function, being then out of communication with their associated ducts.

Surrounding the shaft 8 of the valve is a plug 13 having a snug fit about and snugly contacting the tapered shoulder 14 of the valve stem. A handle 15 may be attached to the shaft of the valve by a nut 16 and its hub 17 will serve to compress the spring 18 and resiliently urge the valve stem outwardly against the plug 13. An arcuate channel 19 in the valve handle cooperates with a stop pin 21 to limit the rotation of the valve.

It will be apparent that this valve may very readily be inserted through the cylinder block into communication with the cylinder. It can be removed with equal convenience at any time for inspection, replacement and to permit inspection of the cylinder interior.

It is contemplated that compression may be relieved to the atmosphere by means of this valve whenever it is desired to start the engine. Furthermore, in order to obtain a high starting compression the valve may be then so rotated as to cut off communication from the cylinder, both to the atmosphere and to the auxiliary chamber. This result is accomplished by rotating the valve to the position shown in Figs. 3 and 4. After the motor has been started and a lower compression is desired for running function, the valve is rotated to the single position shown in Figs. 5 and 6 to permit the auxiliary chamber to function with the cylinder.

By substituting differently shaped plugs for the plugs 22 at the upper ends of the "after" chambers, the volume of these chambers may readily be varied as desired.

It should be understood that the drawing discloses only a preferred embodiment of the invention and that this invention is susceptible of some variation and of embodiment in modified forms which will, nevertheless, remain within the spirit and scope of the invention as expressed in the claim which follows.

Having shown and described my invention, I claim:

In combination with a cylinder block providing a cylinder and an auxiliary chamber spaced apart therefrom, a straight passage leading from the exterior of the block past said chamber into the top of said cylinder, a valve insertable into said passage having a hollow interior, a port in the wall of said valve for establishing communication between the cylinder and chamber when the valve is rotated to one position, a duct from the atmosphere leading to the surface of said passage, and a second port from the hollow interior of said valve registerable with said duct when the valve is rotated to a second position, said ports being positioned so that only one of them may be made operative at one time and so that both may be rendered inoperative at a third position of the valve, and means for rotating said valve to any of said three positions.

CARL C. HINKLEY.